United States Patent [19]

Pinson

[11] Patent Number: 4,831,465
[45] Date of Patent: May 16, 1989

[54] MODE FOR WRITING INFORMATION ON A MAGNETIC RECORDING CARRIER

[75] Inventor: Denis Pinson, Thoiry, France

[73] Assignee: Bull S.A., Paris, France

[21] Appl. No.: 199,353

[22] Filed: May 26, 1988

[30] Foreign Application Priority Data

May 27, 1987 [FR] France .................................. 8707515

[51] Int. Cl.$^4$ .............................................. G11B 5/02
[52] U.S. Cl. ........................................ 360/40; 360/48; 360/51
[58] Field of Search ........................ 360/48, 51, 39, 40

[56] References Cited

U.S. PATENT DOCUMENTS

| 3,952,329 | 4/1976 | Dent, III et al. | 360/40 |
| 4,151,571 | 4/1979 | Cardot et al. | 360/48 |
| 4,669,003 | 5/1987 | Bell et al. | 360/77 |

FOREIGN PATENT DOCUMENTS

| 0013326 | 7/1980 | European Pat. Off. |
| 0130248 | 1/1985 | European Pat. Off. |
| 0159720 | 10/1985 | European Pat. Off. |
| 1307451 | 2/1973 | United Kingdom |

OTHER PUBLICATIONS

Neues Aus Der Technik, No. 3, Jun. 15, 1979, p. 4, Wurzburg, DE; "Servos parkodierungsmuster".
IEEE Trans. on Magnetics, vol. MAG-17, No. 4, Jul. 1981, pp. 1396-1402 IEEE.

Primary Examiner—Vincent P. Canney
Assistant Examiner—Kevin J. Fournier
Attorney, Agent, or Firm—Kerkam, Stowell, Kondracki & Clarke

[57] ABSTRACT

A mode of writing synchronization information on a magnetic recording carrier (DISC) where the information is written in binary code and distributed over a plurality N of tracks, each track being associated with at least one reference zone ($ZRP_{ij}$) which includes a group of preamble information ($ZSY_{ij}+ZSA_{ij}$), a group of absolute address information ($ZAD_{ij}$), and a group of fine-position information ($GDP_{ij}$). According to the invention, the mode of writing is characterized in that the preamble information group includes a first subgroup ($ZSY_{ij}$) of synchronizing information preceding a second subgroup of automatic gain control ($ZCA_{ij}$). The invention is applicable to magnetooptical memories.

11 Claims, 4 Drawing Sheets

MODE FOR WRITING INFORMATION ON A MAGNETIC RECORDING CARRIER

FIELD OF THE INVENTION

The present invention relates to a mode for writing information on a magnetic recording carrier. More particularly, it is applicable to magnetooptical disk memories.

BACKGROUND OF THE INVENTION

In information processing systems, the trend in technology is to use magnetooptical disk memories more and more often, because of the large amount of information they are capable of containing per unit of surface area. These are memories in which the information is recorded on magnetic disks (for example by means of magnetic transducers) and read by optoelectronic devices.

Their mode of operation is based on the magnetooptical effect, which has to do with the interaction of the rectilinear polarized light with the magnetic state of the material comprising the recording layer of the magnetic disks. Reading of the information is performed by an optoelectronic device including a more or less complex optical focusing device associated with photoelectronic transducers and amplifying circuits for the signals furnished by these transducers. These optoelectronic devices make it possible, at a given moment and in a given region, to observe a surface of a disk by means of a beam of polarized light, and to furnish an electrical signal the voltage (or current) of which is a function of the value of the information located in this region. The magnetooptical effect is described in greater detail, and the manner in which it can be used to read the information contained on the magnetic disks of the magnetooptical memory is also discussed in French Pat. No. 2 514,913, filed on Oct. 16, 1981 by CII Honeywell Bull, now known as Bull S.A. This French patent corresponds to U.S. Pat. No. 4,510,544.

It is known that the magnetic disks carry these items of information in an encoded binary form on circular concentric recording tracks the width of which is on the order of several micrometers and which are disposed on both surfaces of the disks.

Each track is assigned a serial number j, j being an integer varying from 0 to $N-1$ and N being the total number of recording tracks. This number of tracks is on the order of several thousand. The encoded expression of the serial number j of a track is known as its address. In this case, the address is called the "absolute address".

The magnetic disks have a constant speed of rotation.

In practice, with standard disk memories (where the information is written and read by the same magnetic transducer), and more particularly in the case of memories that include only a limited number of disks (generally fewer than 4 or 5), the information is recorded on each of the surfaces (sides) of the disks in the manner described in French Pat. No. 2,439,435, filed on Oct. 19, 1978, and corresponding to U.S. Pat. No. 4,354,208. A maximum of space is reserved for recording the data intended for processing by the information processing system to which these memories belong.

A minimum of space is reserved for recording the addresses of the tracks, on the one hand, and on the other for recording the information, known as "fine-position information", necessary for the automatic control of the position above the tracks of the magnetic transducer associated with this side.

In present practice, as described in the aforementioned French patent, the items of information contained on each side of the disk are preferably distributed over equal and adjacent circular sectors $S_0, S_1, \ldots, S_i, \ldots, S_n$. Typically, one side of the disk is divided into several tens of sectors (for example on the order of 80 to 90 sectors).

When a sector $S_i$ (or more generally a first group of information) is read or written prior to a sector $S_{i+1}$ (or more generally, a second group of information), then it is said that the sector $S_i$ precedes the sector $S_{i+1}$.

Each sector $S_i$ is in turn divided into two unequal areas. The larger area includes the data intended for processing by the information processing system to which the disk memory belongs, while the smaller area includes the track addresses and the fine-position information. For each sector, the smaller area is divided into a plurality of zones known as reference zones. Each track is associated with at least one zone having the same serial number j as the track.

A blank zone not containing any information is disposed between the larger area and the smaller area. This blank zone precedes the reference zones.

It is known that in order to record a succession of information on a magnetic disk, a succession of small magnetic domains adjacent to one another and of variable length are created on each track of the disk, distributed over the entire length of the track and alternatingly having magnetization of one type and the opposite type. The geographic boundary between two adjacent magnetic domains is called the magnetic transition.

Each reference zone includes three portions, that is, a first portion known as the preamble, preceding a second portion containing address information, which in turn precedes a third portion including the fine-position information. The preamble portion contains the information, the use of which by the reading circuits of the disk memory makes it possible to determine the gain of the amplifiers of these circuits such that the precision of reading the addresses and the fine-position information is as great as possible. A small portion of this information (generally one or two items of information) located at the beginning of the preamble portion can equally well serve as synchronizing information, making it possible to determine the beginning of each reference zone.

The writing mode described briefly above, used in conventional disk memories, can be transposed and applied to magnetooptical disk memories on the condition that the following disadvantage is overcome:

The portion containing the preamble information is poorly adapted to use in magnetooptical disk memories. In fact, the disks used in these memories have an error rate on the order of $10^{-5}$ (one error per $10^5$ items of information written), which is considered relatively high. The first portion containing the preamble information simultaneously serves on the one hand to monitor the gain of the reading circuit amplifiers and on the other to determine the beginning of the zone and so does not offer sufficient warranty for precise detection of the reference zone, given the aforementioned error rate.

SUMMARY OF THE INVENTION

The mode of writing information in a reference zone in accordance with the invention is particularly well adapted for the precise detection of the reference zones, by overcoming the aformentioned disadvantage.

According to the invention, the mode of writing on a magnetic recording carrier where the information items are written in binary code and are distributed over a plurality N of tracks, each track being associated with at least one reference zone, which includes at least one group of preamble information, a group including absolute address information and a group containing fine-position information, is characterized in that the items of binary information comprise magnetic domains of positive or negative magnetization, depending on the value of the information, the group of preamble information including a first subgroup of synchronizing information preceding a second subgroup of automatic gain control information.

In a preferred embodiment of the invention, the subgroup of synchronization information comprises a pseudo-random binary sequence for which the autocorrelation function is practically zero whenever the temporal offset between, first, the sequence of signals read by the reading device and, second, a reference sequence contained in the housekeeping circuits of the memory containing the magnetic recording carrier is not zero, and is in the vicinity of 1 if this offset is quasi-zero.

The characteristics and advantages of the present invention will become more apparent from the ensuing detailed description given by way of example and taken in conjunction with the accompanying drawings.

BRIEF DESCRIPTION OF THE DRAWINGS

FIG. 1, including

DESCRIPTION OF THE PREFERRED EMBODIMENTS

Figure 1B:
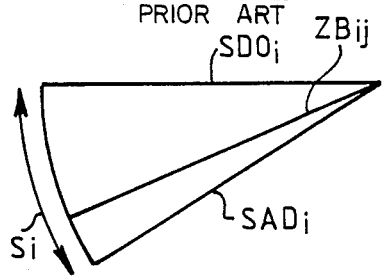
FIGS. 1a, 1b, 1c, shows a preferred example of information distribution on a magnetic disk in the prior art, such as described in the aforementioned French Pat. No. 2,439,435, FIG. 1c being an enlarged view of a portion of FIG. 1a and FIG. 1b showing a portion of the disk in greater detail.
Figure 1A:
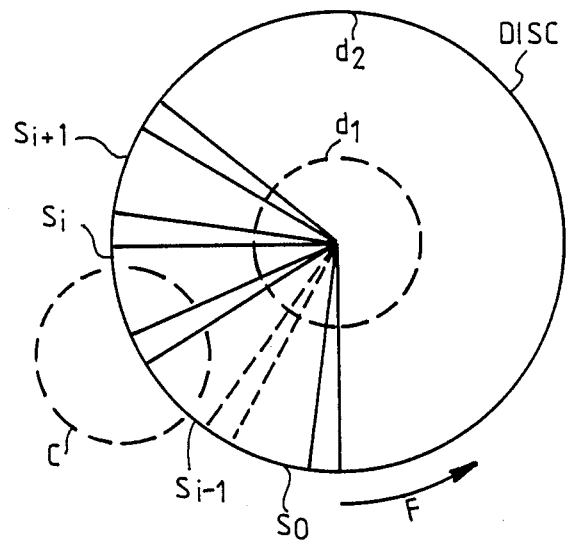
Figure 1C:
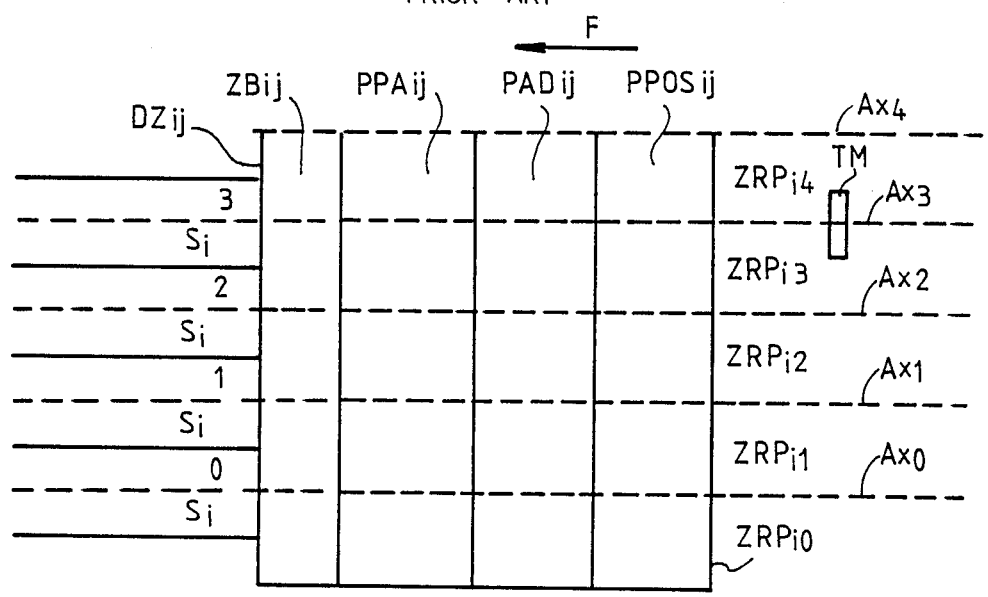
Figure 2:
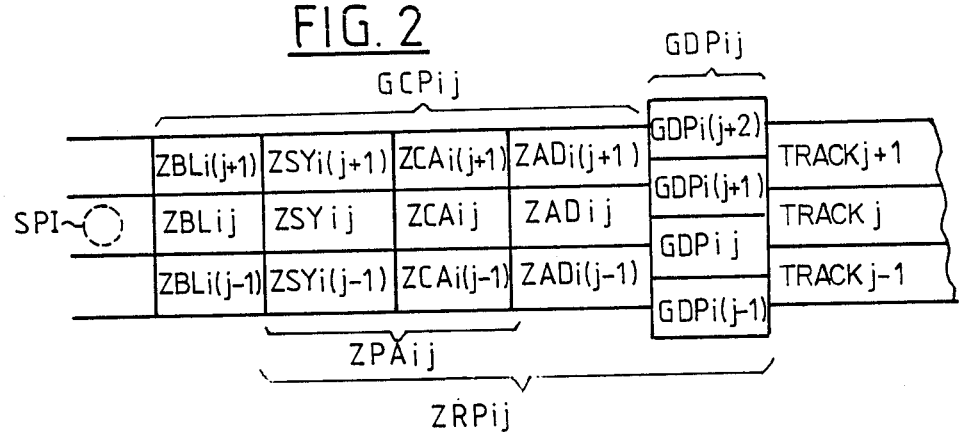
FIG. 2 shows a set of three reference zones where the items of information are written by the mode of writing according to the invention.
Figure 3:
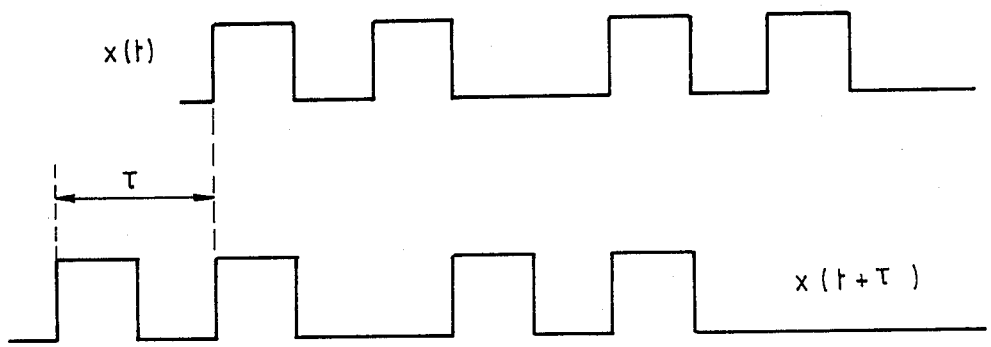
FIG. 3 shows how an autocorrelation function is calculated.

In order to better understand how the items of information of reference zones of a recording carrier are written in accordance with the invention, some review is necessary, illustrated by FIGS. 1a, 1b, 1c, showing on the one hand how the items of information are distributed over the surface of a magnetic recording carrier, such as a magnetic disk, in the prior art (FIGS. 1a and 1b) and on the other hand, some review illustrated by FIG. 1c showing how the items of information are written inside the reference zones, again according to the prior art.

In FIGS. 1a–1c, it is assumed that the items of information are written in the reference zones of a magnetic disk DISC.

In FIG. 1a, this disk DISC rotates in the direction of the arrow F. Its useful recording surface area is defined by the circles $d_1$, $d_2$. On the disk DISC, a number p of equal and adjacent circular sectors $S_0$, $S_1$, ..., $S_i$, ..., $S_p$ are defined. Thus as can be better seen in FIG. 1b, each sector $S_i$ is divided into two portions $SDO_i$, $SAD_i$, where the data to be processed are on the one hand recorded and on the other hand the address information and fine-position information are recorded, respectively. The surface area of the portion $SAD_i$ is much less than (several percent of) the surface area of the portion $SDO_i$.

Each portion $SAD_i$ of a predetermined sector $S_i$ is divided into $N'=(N+1)$ reference zones $ZRP_{i0}$, ..., $ZRP_{ij}$, ..., $ZRP_{i(N)}$, where N is the total number of recording tracks of the disk DISC. For simplification, FIGS. 1b and 1c show only the reference zones $ZRP_{i0}$ through $ZRP_{i4}$, these zones being symbolized by the rectangles in FIG. 1c.

The boundaries between the various reference zones $ZRP_{ij}$ are coincident with the circles $Ax_j$ defining the middle of a recording track of the magnetic disk DISC. It can be seen that in each sector $S_i$, the reference zones $ZRP_{ij}$ and $ZRP_{i(j+1)}$ are associated with the track of serial number j. Thus the two reference zones $ZRP_{i0}$ and $ZRP_{i1}$ are associated with the track of serial number zero, while the reference zones $ZRP_{i1}$, $ZRP_{i2}$ are associated with the track of serial number one, and so forth.

FIG. 1c, in a more precise manner, shows the kind of information contained in each reference zone $ZRP_{ij}$ and how these items of information are distributed inside the zone (as described in the aforementioned French Pat. No. 2 439 435).

The zone called the blank zone $ZB_{ij}$, where the magnetization is uniform (typically zero) precedes the reference zone $ZRP_{ij}$, which makes it easier to locate the beginning of the zone $DZ_{ij}$, which is most often indicated by the first transition and possibly the second transition of the first portion $PPA_{ij}$ of the zone defined below. The reference zone $ZRP_{ij}$ includes three portions $PPA_{ij}$, $PAD_{ij}$, $PPOS_{ij}$, each including an identical number of items of binary information (for example, about 10), which items are each contained in one information cell. The first portion, called, $PPA_{ij}$ includes the preamble information (as defined above).

The portion $PAD_{ij}$ includes a certain number of items of information defining the absolute address of the track (it is understood that the number is a function of the total number of track contained on the disk). The portion $PPOS_{ij}$ includes a certain number of items of fine-position information making it possible to keep the reading transducer associated with the disk DISC centered perfectly above the track of serial number j facing which it is located. This enables much greater precision in reading of the data by the transducer.

Each binary item of information may comprise either a single magnetic transition or a double magnetic transition.

Thus as has been noted above, given the relatively high error rate in writing information on the disks of magnetooptical memories (on the order of $10^5$), the mode of detecting the reference zone using the first or even the second magnetic transition of the first portion $PPA_{ij}$ proves to be inadequate.

The mode of writing information inside the reference zones in accordance with the invention makes it possible to overcome the aforementioned disadvantages and is particularly well suited for use in the disks of magnetooptical memories, which for the sake of simplification will be called magnetooptical disks. Thus for the following discussion it is assumed that the disk DISC is magnetooptical.

Inside each reference zone $ZRP_{ij}$, each binary item of information comprises a magnetic domain of either positive or negative magnetization. The value of each item of information is a function of the sign (+ or −) of the magnetization in each domain (which thus comprises one cell containing one item of information). Thus a binary item of information equal to logical one corresponds with a domain of positive magnetization, for example, while a binary item of information equal to logical zero corresponds to a negative magnetization.

Thus it will be seen that the items of binary information are not constituted by the magnetic transitions, but instead are constituted directly by the sign of the magnetization inside each elementary magnetic domain.

Each reference zone $ZRP_{ij}$ includes the following:

(A) a first portion, known as the first group of information, that is, $GCP_{ij}$, containing a plurality of magnetic zones which in turn comprise, respectively:
  1. a group of preamble information $ZPA_{ij}$, including:
     (a) a subgroup $ZSY_{ij}$ including synchronizing information making it possible to precisely locate the beginning of the reference zone $ZRP_{ij}$,
     (b) a subgroup $ZCA_{ij}$, the reading of which makes it possible to determine the gain of the amplifiers of the reading circuits for information contained on the disk DISC; and
  2. a group of address information $ZAD_{ij}$. As in the reference zones $ZRP_{ij}$ of the prior art, the address is an absolute address and is written in Gray code.

The first portion $GCP_{ij}$ is preceded by the blank zone $ZBL_{ij}$.

The subgroup of information $ZCA_{ij}$, for example contains 6 pairs of bits equal to 1 and 0. Hence this latter comprises a succession of 1s and 0s, hence a succession of 6 pairs comprising a magnetic domain of positive magnetization followed by a magnetic domain of negative magnetization.

As for the group of address information, it contains 16 bits, which makes it possible to enumerate $2^{16}$ tracks (approximately 65,000 addressable tracks).

Each reference zone $ZRP_{ij}$ also includes:

B. a second portion, also called the second group of information, that is, $GDP_{ij}$.

For reasons explained in the French patent application filed jointly with the present application, the first portion is such that the magnetic domains comprising it have substantially the same width as the data track of serial number j and have the same center. In other words, the circle comprising the center of the track of serial number j coincides with the circle comprising the center of the first portion of the reference zone $GCP_{ij}$. This first portion of the reference zone $ZRP_{ij}$ can also be said to be "full track" centered.

As for the second portion $GDP_{ij}$, it is off-center with respect to the data tracks of serial number j. Thus each second portion $GDP_{ij}$ is off-center by a width equal to that of one-half track with respect to the tracks of serial number j, which means that the boundary between two second portions $GDP_{ij}$ and $GDP_{i(j+1)}$, or between $GDP_{ij}$ and $GDP_{i(j-1)}$, coincides respectively with the center of the track j and the center of the track (j−1).

In a preferred embodiment of the invention, the subgoup of synchronizing information $ZSY_{ij}$ comprises a pseudo-random binary sequence, that is, of finite length, in other words containing a finite number of bits, and the detection of this binary sequence is accomplished by correlation between a reference sequence, identical to that binary sequence, on the one hand, and memorized in the housekeeping circuits of the magnetooptical disk memory containing the disk DISC, and on the other hand the sequence of bits $ZSY_{ij}$ read by the optical reading device of the magnetooptical disk memory.

The mode of detecting a sequence of bits by autocorrelation is well known, for example being described in the book entitled "Commande et régulation par calculateur numérique" [Control and Regulation by Numerical Calculator], by C. Foulard, S. Gentile, and G. P. Sandraz, published by Editions Eyrolles.

It will be remembered that detection by correlation is performed by calculating the following autocorrelation function $YXX(\tau)$, where:
where T is the integration time.

In the above, x(t) is the function corresponding to the reference sequence, and $x(t+\tau)$ is the function corresponding to the sequence read by the optical reading device when it is located facing a subgroup of synchronizing information $ZSY_{ij}$.

$\tau$ is the temporal offset between the two functions x(t) and $x(t+\tau)$, where x(t) or $x(t+\tau) \in \{-1; +1\}$.

This autocorrelation function is equal to 1 if the temporal offset $\tau$ is zero and is near zero if $\tau$ is different from zero.

In practice, the function $\rho XX^{(n)}$ is calculated by the following equation:

$$\rho XX^{(n)} = \frac{1}{N} \sum_{k=1}^{N} a_k \oplus a_{(k=n)}^2 \begin{array}{l} = 1 \text{ if } n = 0 \\ = 0 \text{ if } n \neq 0 \end{array}$$

where n is a number of delaying samples corresponding to the temporal offset $\tau$. If $T_0$ is the sampling period (defined below) or duration of each delay sample, then substantially $nT_0 = \tau$ where $$a_k \epsilon \{0; 1\} \tag{3}$$

The synchronizing sequence is defined by the polynomial R that follows (also see the aforementioned book), such that:

$$0 = 1 \oplus R \oplus R^4 \tag{4}$$

Or again:

$$R_1(k+1) = R_1(k) \oplus R_4(k) \tag{5}$$

and expressions 4 and 5 are equivalent.

In a preferred embodiment of the invention, the various successive values of the bits comprising the sequence are selected to be the values $R_1(k)$, these values being calculated on the basis of the following initial values:

$$R_1(0) = 1$$

$$R_2(0) = R_3(0) = R_4(0) = 0 \tag{6}$$

$$R_2(k+1) = R_1(k)$$

$$R_3(k+1) = R_2(k) \tag{7}$$

$$R_4(k+1) = R_3(k)$$

After various tests amnd simulations done on the computer, it has been found that a pseudo-random binary sequence of 15 bits was suitable and enabled precise detection of the reference zone $ZRP_{ij}$ making it possible to absorb all the possible errors contained in the sequence, with a good autocorrelation function of approximately 70% (0.7).

This binary sequence is as follows:

111101011001000

Figure 4B:
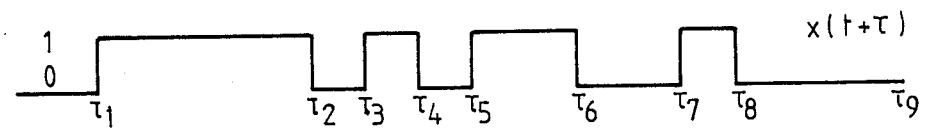
FIGS. 4A and 4B show a subgroup of synchronizing information according to the invention, comprising a pseudo-random binary sequence.
Figure 4A:
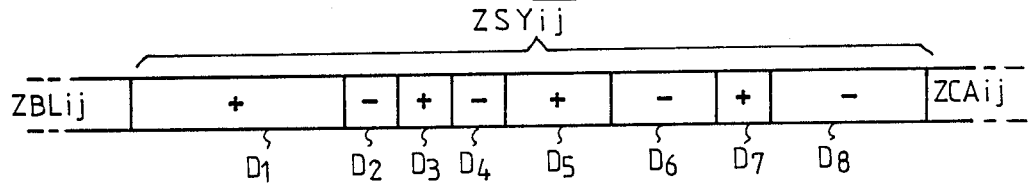

The subgroup of synchronizing information $ZSY_{ij}$ comprising the sequence written above is represented in FIG. 4a; it includes a succession of magnetic domains $D_1, D_2, \ldots D_8$.

The domains $D_1, D_3, D_5, D_7$ have a positive magnetization, while the domains $D_2, D_4, D_6, D_8$ have negative magnetization.

It is known that to facilitate the recognition of information in a reference zone (and more generally of all the data contained on a magnetic or magnetooptical disk), the information bits are written inside cells of bits having the same length L (and consequently the duration for reading these cells is the same, that is, $T_{nom}$). The bits are then written inside these bit cells with a predetermined value.

Hence it is clear that the domain $D_1$ of positive magnetization has a length equal to 4L, while the domain $D_3$ has a length equal to L, the domain $D_5$ has a length equal to 2L and the domain $D_7$ has a length equal to L.

The magnetic domains of negative magnetization, $D_2, D_4, D_6$ and $D_8$ respectively have lengths equal to L, L, 2L, 3L.

In the same manner, if one considers the function $x(t+\tau)$ shown in FIG. 4b, which corresponds to the information read by the optical reading device of the disk memory and which are put into form by the reading circuits associated with this optical reading device, this function is equal to logical 1 between time $\tau_1$ and $\tau_2$ (which corresponds to the time for reading the magnetic zone $D_1$), between times $\tau_3$ and times $\tau_4$ (the reading of the domain $D_3$), between times $\tau_5$ and $\tau_6$ (reading of domain $D_5$), and between the time $\tau_7$ and between the time $\tau_7$ and $\tau_8$ (reading of domain $D_7$).

The function $x(t+\tau)$ is equal to logical 0 between times $\tau_2$ and $\tau_3$ (reading of magnetic domain $D_2$), between times $\tau_4$ and $\tau_5$ (reading of domain $D_4$), between times $\tau_6$ and $\tau_7$ (reading of domain $D_6$), and beginning at time $\tau_8$ up to time $\tau_9$, which represents the instant at which the reading of the sequence ceases.

Hence:

$\tau_1 - \tau_2 = 4T_{nom}$
$\tau_3 - \tau_2 = T_{nom}$
$\tau_4 - \tau_3 = T_{nom}$
$\tau_5 - \tau_4 = T_{nom}$
$\tau_6 - \tau_5 = 2T_{nom}$
$\tau_7 - \tau_6 = 2T_{nom}$
$\tau_8 - \tau_7 = T_{nom}$
$\tau_9 - \tau_8 = 3T_{nom}$ In practice, in order to recognize the various bits of the binary sequence contained in the subgroup $ZSY_{ij}$, a sampling clock is used (contained in the housekeeping circuits of the magnetooptical memory), the period $T_0$ of which is less than the period $T_{nom}$, the latter also being known as the bit period.

The sampling of this binary sequence of synchronizing information is performed beginning at an initial instant $t_i$ (see FIG. 7), which is located in the period of time where the optical reading device of the magnetooptical memory is located facing the blank zone $ZBL_{ij}$.

At the time of these sampling instants, identified by k, the values of the coefficients $a_k$ and $a_{k+n}$ can be determined, and hence the autocorrelation function can be calculated by means of OR circuits contained in the housekeeping circuits of the magnetooptical disk memory.

As soon as the autocorrelation function a reaches a certain value (0.7; see above), it can be seen that the reference zone $ZRP_{ij}$ is detected, which is accomplished at time $t_d$. A clock $H_s$, called the "servo" clock, the period of which is equal to the bit period, or $T_{nom}$, is triggered, immediately following time $t_d$, within a period of time not exceeding $0.5T_{nom}$. This servo clock is understood to be of a known type and is contained in the aforementioned housekeeping circuits (see FIG. 7).

The ratio between the sampling period $T_0$ of the subgroup of synchronizing information and the bit period $T_{nom}$ is found by using the following reasoning:

In practice, if one considers the magnetic transitions corresponding to two adjacent reference zones $ZRP_{ij}$ and $ZRP_{i(j+1)}$, that is, occupying the same position inside each of these two zones, these zones are not perfectly aligned with respect to one another (that is, they are not located on the same vector ray). This is due to the imprecision with which the magnetic writing transducer is positioned above the disk, on the one hand, and on the other hand to the imprecision in determining the instant at which a magnetic transition is written. As a result, the signal S for reading a predetermined transition of a reference zone $ZRP_{ij}$, as a function of time, takes a form which varies from one zone to another and depends on the one hand on the manner in which the magnetic transition between the two successive revolving magnetic domains has been written, and on the other hand on the manner in which it is read. This signal thus takes the form of a wave, which varies between the form $S_1$ and the form $S_2$ shown in FIG. 6.

The signal S has a substantially trapezoidal form.

Figures 5, 6A, 7:
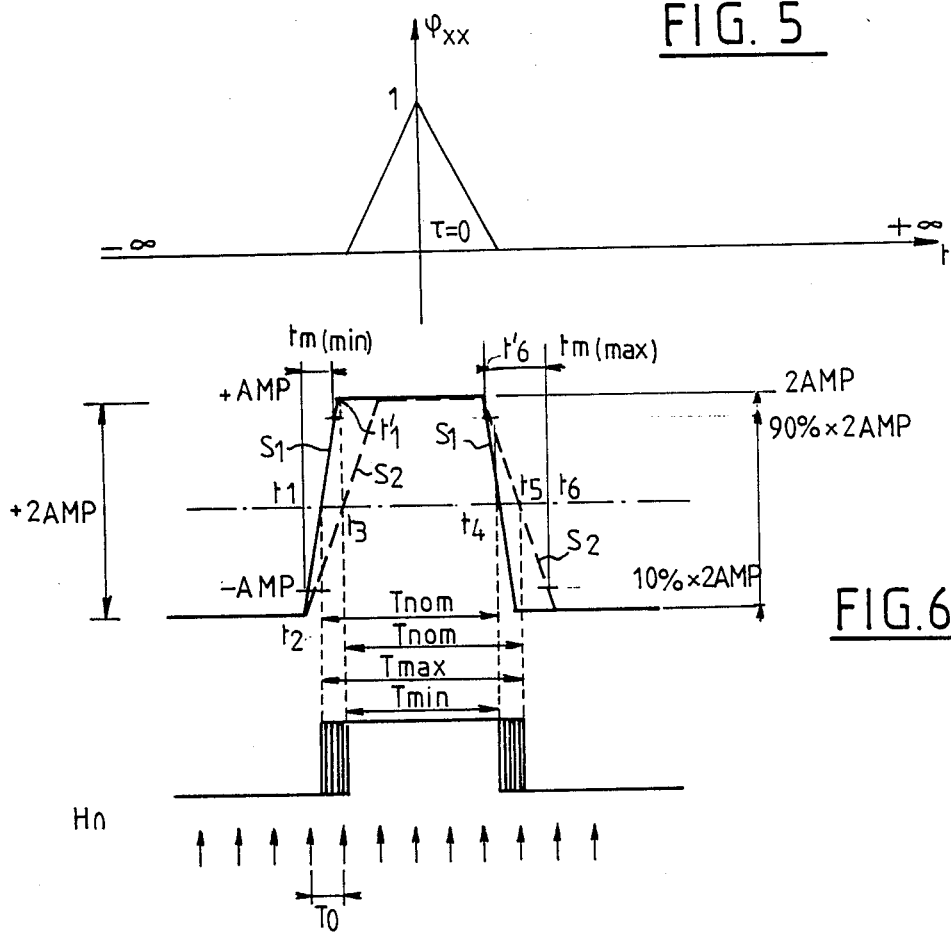
FIGS. 5, 6a, 6b, and 7 show how the beginning of a reference zone is detected by means of a subgroup of synchronizing information according to the invention.
Figure 6B:
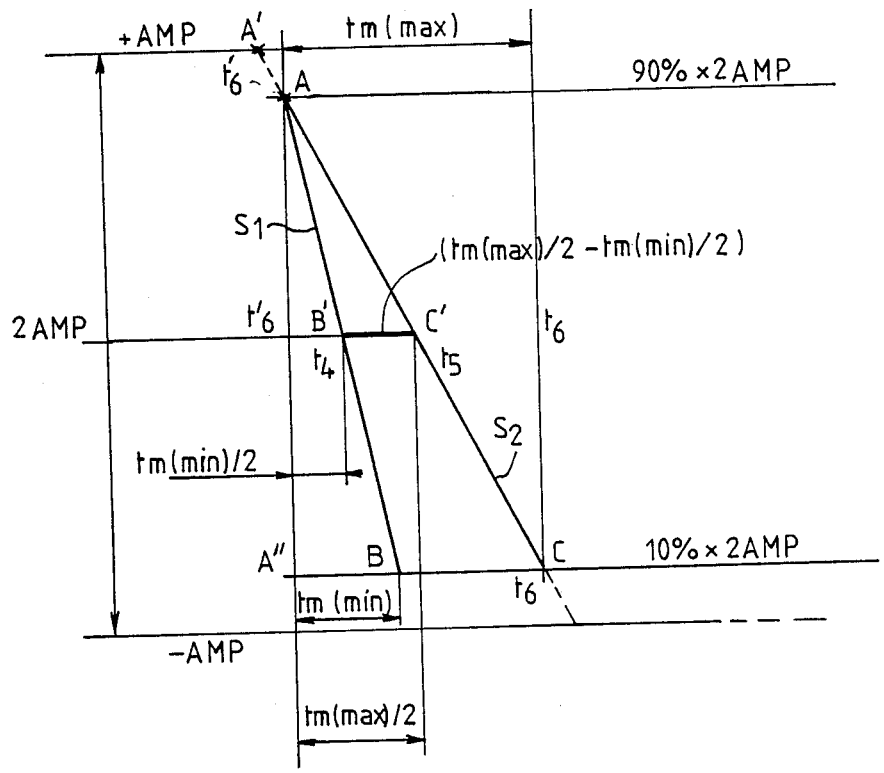

In FIG. 6a, it has been assumed that the signals S, $S_1$, $S_2$ are carried back to the same origin of time $t_0$, for better comprehension of the reasoning that follows:

The positive peak signal of the signals S, $S_1$, $S_2$ has been designated +AMP, and the negative peak signal has been designated −AMP. The amplitude from peak to peak is hence +2AMP (FIGS. 6a and 6b). As is conventional in practice, times $t_1$ and $t'_1$ are defined where the signal $S_1$ respectively has an amplitude equal to 10 and 90% of the peak-to-peak amplitude of the signal (the signal $S_1$ is that which has the minimum rise time), and times $t'_6$ and $t_6$ are defined where the signal $S_2$ respectively has an amplitude equal to 90% and 10% of the peak-to-peak amplitude (signal $S_2$ is that which has the maximum decay time).

Practically, $t_1$ is defined as equal to the instant where $S_2$ has an amplitude equal to 10% of the peak-to-peak amplitude, and $t_6$ is the instant at which $S_1$ has an amplitude equal to 90% of the peak-to-peak amplitude (although in the most rigorous sense this is not precisely true, but it is considered to be true with sufficient approximation).

This is the reason why in FIG. 6b, in an enlargement of the right-hand portion of FIG. 6a, it is assumed that $S_1$ is represented by the two segments A'A and AB (while in reality $S_1$ is defined by the segment A'B, but it is clear that A'B is practically coincident with the dashed line A'AB).

It will be seen that this approximation facilitates the calculations to be made below.

If $t_2$ and $t_4$ are the times at which the signal $S_1$ passes through the values of 0, and $t_3$ and $t_5$ are the instants at which the signal $S_2$ passes through this same value of 0, then in practice the following is true:

$$T_{nom} = t_4 - t_2 = t_5 - t_3$$

Assuming:

$$T_{max} = t_5 - t_2, \text{ and}$$

$$T_{min} = t_4 - t_3,$$

then the true duration of the signal corresponding to one elementary bit will be included between $T_{min}$ and $T_{max}$, which is expressed by equation 8:

$$T_{min} < T_{nom} < T_{max} \tag{8}$$

Turning to FIG. 6b:

$$T_{min} = t_4 - t_3 = t_5 - t_3 - (t_5 - t_4)$$

Hence $$T_{min} = T_{nom} - (t_5 - t_4).$$

In the triangle ABC, $B'C' = BC/2$, since B' and C' are the centers of AB and AC, where $B'C' = t_5 - t_4$.

If A" is the projection of A onto BC, then: $BC = A''C - A''B$

A"C and A"B are respectively the maximum and minimum decay times. The signals $S_1$ and $S_2$ are practically symmetrical (being isosceles trapezoids), so A"C and A"B are also the maximum and minimum rise times and are designated as $t_{m(max)}$ and $t_{m(min)}$ then:

$$A''C = t_6 - t'_6 = t_{m(max)}$$

$$A''B = t'_1 - t_1 = t_{m(min)}$$

Hence:

$$B'C' = t_{m(max)}/2 - t_{m(min)}/2 = t_5 - t_4$$

and hence $$T_{min} = T_{nom} - (t_{m(max)})/2 - t_{m(min)}/2$$

$$\begin{aligned} T_{max} &= t_5 - t_2 = t_4 - t_2 + (t_5 - t_4) \\ &= T_{nom} + (t_5 - t_4) \\ &= T_{nom} + (t_{m(max)}/2 - t_{m(min)}/2) \end{aligned}$$

Assume that $$\Delta t_m = t_{m(max)} - t_{m(min)} \tag{11}$$

Then:

$$T_{min} = T_{nom} - \Delta t_m/2 \tag{12}$$

$$T_{max} = T_{nom} + \Delta t_m/2 \tag{13}$$

It is desired to define a time T such that:

$T = nT_0$ ($T_0$ = sampling period and n is a positive integer).

Depending on the sampling phase with respect to the signal, the number of samples n in $T_x$ will be given by:

$$n = \text{Ent}(T_x/T_0) \tag{15}$$

$$\text{or } n = \text{Ent}(T_x/T_0) + 1 \tag{16},$$

where Ent represents the function "integral of".

If it is desired to limit the uncertainty of n to the value $n_1$ or $n_1 + 1$ (that is, that n should be equal to $n_1$ or $n_1 + 1$), then necessarily, $$\text{Ent}(T_x/T_0) = n_1 \tag{17}.$$

Where $T_{nom} - \Delta t_m/2 < T_x < T_{nom} + \Delta t_m/2$, the attempt is made that $n_1$ should be a positive integer independent of $\Delta t_m/2T_0$, that is:

$$n_1 = \text{Ent}(T_x/T_0), n_1 = \text{Ent}[(T_{nom}/T_0)] \pm [(\Delta t_m/2T_0)] \tag{18},$$

regardless of $\Delta t_m/2T_0$.

This is obtained if:

$$|\Delta t_m/2T_0| < 0.5 \text{ and } (T_{nom}/T_0) = (2k+1)/2 \tag{19}$$

where k is a positive integer, or again, $T_0 > |\Delta t_m|$.

Then $n_1$ is defined perfectly regardless of $T_x$.

In effect: $(T_{nom}/T_0) = (2k+1)/2 \epsilon \{0.5, 1.5, 2.5, \ldots\}$ where $|\Delta t_m/2T_0| < 0.5$, it is assured that $$\text{Ent}(1.5 + |\Delta t_m/2T_0|) = 1$$

or that:

$$\text{Ent}(2.5 + |\Delta t_m/2T_0|) = 2$$

and so forth.

Experimental tests have shown for example that $t_{m(max)}$ and $t_{m(min)}$ would be on the order of 95 or 57 nanoseconds, which means that $\Delta t_m$ is on the order of 38 nanoseconds.

Moreover, the bit period $T_{nom} = T_0 \times (2k+1)/2$, where k can assume the values 1, 2, 3 and so forth.

If $T_0 = 50$ nanoseconds, then the bit period may assume the values 75, 125, 175, 225 nanoseconds, and so forth.

It will be seen that the bit period $T_{nom}$ *equals an uneven multiple of one-half the sampling period* $T_0$ of synchronization.

With a correlation rate of 70%, a value of k is preferably selected equal to 4, which gives a bit period $T_{nom}$ of 225 nanoseconds and makes it possible to determine the beginning of the reference zone with sufficient precision, that is, the instant $t_d$ as shown in FIG. 7. This FIG. 7 shows various wave forms corresponding to the signals read by the optical reading device when it is successively facing the synchronization subgroup $ZSY_{ij}$ and the preamble subgroup $ZCA_{ij}$ and the address subgroup $ZAD_{ij}$.

What is claimed is:

1. A mode of writing synchronizing information on a magnetic recording carrier (DISC) where the information items are written in binary code and are distributed over a plurality N of tracks, each track being associated with at least one reference zone ($ZRP_{ij}$) which includes at least one group of preamble information ($ZSY_{ij} + ZCA_{ij}$), one group including absolute address information (ZAD$_{ij}$) and one group containing fine-position information (GDP$_{ij}$), the group of preamble information including a first subgroup (ZSY$_{ij}$) of synchronizing information preceding a second subgroup of automatic gain control (ZCA$_{ij}$), characterized in that the synchronzing information subgroup (ZSY$_{ij}$) comprises a pseudo-random binary sequence for which the function of autocorrelation is practically zero when the temporal offset $\tau$ between the sequence of signals read by the reading device of the carrier corresponding to said binary sequence, on the one hand, and a reference sequence contained in the housekeeping circuit of the memory containing the magnetic recording carrier, on the other, is not zero, this function being in the vicinity of one if the offset $\tau$ is quasi-zero.

2. A writing mode as defined by claim 1, characterized in that the pseudo-random binary sequence is defined by the following polynomial:

$$0 = 1 \oplus R \oplus R^4 \quad (4),$$

or, $$R_{1(k+1)} = R_{1(k)} \oplus R_{4(k)} \quad (5),$$

where k is a positive integer, not zero.

3. A mode of writing as defined by claim 2, characterized in that the value of each of the bits of the sequence is given by the polynomials $R_{1(k)}$, where:

$$R_1(0) = 1; \quad R_2(0) = R_3(0) = R_4(0) = 0, \quad \text{and}$$
$$R_{2(k+1)} = R_{1(k)}, \quad R_{3(kI)} = R_{2(k)}; \quad R_{4(k+1)} = R_{3(k)}.$$

4. A mode of writing as defined by claim 1, characterized in that the group of preamble information precedes the group of address information and with it forms a first portion of the reference zone (GCP$_{ij}$) which is disposed and centered on the track of serial number j, while the fine-position information forms a second portion (GDP$_{ij}$) offset with respect to the center of this same track on the same side thereof, such that the boundary between two second portions belonging to two reference zones adjacent one another coincides with the center of the track of serial number j.

5. A mode of writing as defined by claim 1, characterized in that the sampling period $T_0$ of the synchronization information subgroup (ZSY$_{ij}$) and the bit period $T_{nom}$ common to all the bits recorded in the reference zone (ZRP$_{ij}$) are such that the bit period is an uneven multiple of the sampling period $T_0$.

6. A magnetooptical memory including a magnetooptical disk and housekeeping circuits that memorize the pseudo-random binary sequence written in accordance with claim 2.

7. A mode of writing as defined by claim 2, characterized in that the group of preamble information precedes the group of address information and with it forms a first portion of the reference zone (GCP$_{ij}$) which is disposed and centered on the track of serial number j, while the fine-position information forms a second portion (GDP$_{ij}$) offset with respect to the center of this same track on the same side thereof, such that the boundary between two second portions belonging to two reference zones adjacent one another coincides with the center of the track of serial number j.

8. A mode of writing as defined by claim 3, characterized in that the group of preamble information precedes the group of address information and with it forms a first portion of the reference zone (GCP$_{ij}$) which is disposed and centered on the track of serial number j, while the fine-position information forms a second portion (GDP$_{ij}$) offset with respect to the center of this same track on the same side thereof, such that the boundary between two second portions belonging to two reference zones adjacent one another coincides with the center of the track of serial number j.

9. A mode of writing as defined by claim 2, characterized in that the sampling period $T_0$ of the synchronization information subgroup (ZSY$_{ij}$) and the bit period $T_{nom}$ common to all the bits recorded in the reference zone (ZRP$_{ij}$) are such that the bit period is an uneven multiple of the sampling period $T_0$.

10. A mode of writing as defined by claim 3, characterized in that the sampling period $T_0$ of the synchronization information subgroup (ZSY$_{ij}$) and the bit period $T_{nom}$ common to all the bits recorded in the reference zone (ZRP$_{ij}$) are such that the bit period is an uneven multiple of the sampling period $T_0$.

11. A mode of writing as defined by claim 4, characterized in that the sampling period $T_0$ of the synchronization information subgroup (ZSY$_{ij}$) and the bit period $T_{nom}$ common to all the bits recorded in the reference zone (ZRP$_{ij}$) are such that the bit period is an uneven multiple of the sampling period $T_0$.

* * * * *

UNITED STATES PATENT AND TRADEMARK OFFICE
CERTIFICATE OF CORRECTION

PATENT NO. : 4,831,465

DATED : May 16, 1989

INVENTOR(S) : Pinson

It is certified that error appears in the above-identified patent and that said Letters Patent is hereby corrected as shown below:

In Col. 10, lines 49 and 50, after "$T_{nom}$", "equals an uneven multiple of one-half the sampling period" should be in lower case form and "$T_o$" should appear as an upper case "T" and subscript "o". The entire sentence should appear as -- It will be seen that the bit period $T_{nom}$ equals an uneven multiple of one-half the sampling period $T_o$ of synchronization--.

In Col. 11, line 47, and Col. 12, line 32, only "nom" should appear as a subscript following "T" and the expression should appear as --$T_{nom}$ common to all the bits recorded in the reference zone ($ZRP_{ij}$) are --.

Signed and Sealed this

Eighth Day of May, 1990

Attest:

HARRY F. MANBECK, JR.

*Attesting Officer*     *Commissioner of Patents and Trademarks*